United States Patent [19]

Satomi et al.

[11] Patent Number: 4,759,053
[45] Date of Patent: Jul. 19, 1988

[54] FACSIMILE/CHARACTER COMMUNICATION SYSTEM

[75] Inventors: Mitsuo Satomi, Nagaokakyo; Kou Chiba, Kawagoe, both of Japan

[73] Assignee: Murata Kikai Kabushiki Kaisha, Kyoto, Japan

[21] Appl. No.: 669,120

[22] Filed: Nov. 7, 1984

[30] Foreign Application Priority Data

Nov. 11, 1983 [JP] Japan .................................. 58-212939

[51] Int. Cl.$^4$ ........................ H04M 11/00; H04N 1/00
[52] U.S. Cl. .................................... 379/100; 358/257; 358/263
[58] Field of Search ............. 179/2 DP; 358/263, 258, 358/257; 379/100

[56] References Cited

U.S. PATENT DOCUMENTS

| | | | |
|---|---|---|---|
| 3,711,646 | 1/1973 | Vermilion et al. | 179/2 DP X |
| 4,151,562 | 4/1979 | Tregay | 358/263 X |
| 4,317,136 | 2/1982 | Keyt et al. | 358/257 X |
| 4,506,111 | 3/1985 | Takenouchi et al. | 179/2 DP |
| 4,532,379 | 7/1985 | Tsukioka | 358/257 X |
| 4,573,083 | 2/1986 | Shimizu | 358/257 |
| 4,586,086 | 4/1986 | Ohzeki | 358/257 X |
| 4,638,368 | 1/1976 | Shimizu et al. | 358/263 X |
| 4,672,459 | 6/1987 | Kudo | 358/257 |
| 4,719,517 | 1/1988 | Vano | 358/257 X |

FOREIGN PATENT DOCUMENTS

| | | | |
|---|---|---|---|
| 58-36068 | 3/1983 | Japan | 358/257 |
| 58-87960 | 5/1983 | Japan | 358/258 |

OTHER PUBLICATIONS

K. E. Clarke, "The Application of Picture Coding Techniques to View Data", *IEEE Transactions on Consumer Electronics*, vol. CE-Aug. 26, 1980, pp. 568-577.
T. Kamae, "Development of A Public Facsimile Communication System Using Storage and Conversion Techniques", IEEE 1980 National Telecommunications Conference, Houston, TX, USA, Nov. 30-Dec. 4, 1980, pp. 19.4.1 to 19.4.8.

*Primary Examiner*—Keith E. George
*Attorney, Agent, or Firm*—Spensley Horn Jubas & Lubitz

[57] ABSTRACT

A facsimile communication system incorporates a plurality of terminal equipments, each comprising a keyboard capable of character data input operation and a facsimile equipment which operates in accordance with commands given thereto through the keyboard, and a host computer connected through telephone lines to the terminal equipments. The facsimile communication system includes equipment for transmitting or receiving character data through steps for converting the character data into character codes, equipment for transmitting or receiving picture data through steps for converting the picture data into picture codes, equipment for discriminating the converted picture codes or the converted character codes from each other, and equipment for recording received character data and picture data integrally on a recording sheet.

4 Claims, 5 Drawing Sheets

FACSIMILE/CHARACTER COMMUNICATION SYSTEM

BACKGROUND OF THE INVENTION

1. Field of the Invention

The present invention relates to a communication system employing facsimile equipments.

2. Prior Art

Various communication means including various combinations of telephone systems, telex systems and/or facsimile systems have been proposed with the development of communication networks and the combination of those communication means with computers has realized a novel communication system designated as an electronic mail system.

The present invention proposes a communication system employing the electronic mail system to provide the communication means with further replete functions.

SUMMARY OF THE INVENTION

It is an object of the present invention to develop a communication system capable of integrating character information and picture information through the combination of character communication by the telex system and picture communication by the facsimile system.

A facsimile/character communication system of the present invention comprises a plurality of terminal equipments each provided with a keyboard capable of character data input operation and a facsimile equipment which operates in accordance with commands given thereto through the keyboard, and a host computer connected through telephone lines to the terminal equipments. The data intercommunication between the terminal equipments is done through the process of integrally sorting the character data entered through the keyboards and picture data given by the facsimile equipments in the memory of the host computer.

The terminal equipments and the host computer exchange the character data with each other by the use of character codes each corresponding to a character and the terminal equipments record the received character data and picture data integrally on a recording sheet after decoding the character data and the picture data separately.

DETAILED DESCRIPTION OF THE INVENTION

The present invention will be described hereinafter in connection with the accompanying drawings.

Figure 1:
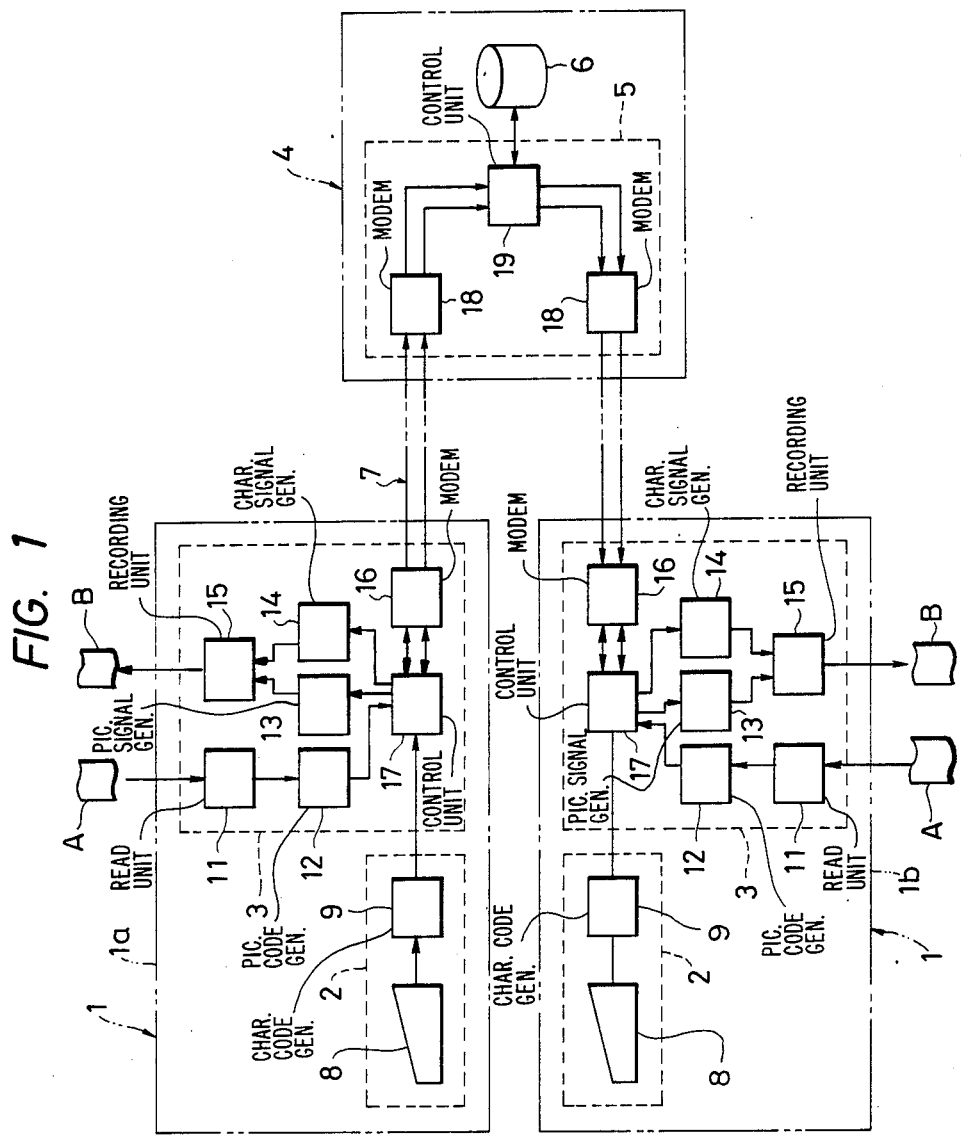
FIG. 1 is a block diagram showing the general constitution of a facsimile communication system according to the present invention.

FIG. 1 is a schematic illustration of a communication system according to the present invention, mainly showing the flow of character data and picture data. In FIG. 1, indicated at 1 is a terminal equipment equipped with a keyboard 2 and a facsimile equipment 3 and at 4 is a host computer consisting of a facsimile interface 5, a memory 6 and other peripheral equipments. A plurality of the terminal equipments 1 are installed for every single one of the host computer 4 and are connected through telephone lines 7 to the host computer. The keyboard 2 is capable of character data input operation. The character data and various commands entered by operating the operation keys 8 are changed into character codes corresponding to the characters by means of a character code generator 9, and then supplied to the facsimile equipment 3. The facsimile equipment 3 has a read unit 11 which reads and photoelectrically converts an original document A, a picture code generator 12 which encodes binary signals representing white or black given by the read unit 11 into picture codes such as run length codes or MH codes in conformity with the CCITT standard, a picture signal generator 13 which decodes the picture codes into the original black-and-white signals, a known character signal generator 14 which decodes the character codes into character pattern signals each consisting of a combination of binary codes for black and white, a recording unit 15 which prints the respective signals given by the picture signal generator 13 and the character signal generator 14 on a recording sheet B, a MODEM (Modulator and Demodulator) 16 and a control unit 17 which controls the signal transmission and reception between the MODEM 16 and the generators 9, 12, 13 and 14. The facsimile interface 5 has MODEMs 18 and a control unit 19 which controls signal transmission and reception between the MODEMs 18 and the memory 6.

The functions of this facsimile communication system will be described hereunder on an assumption that, in FIG. 1, the terminal equipment 1a is a source and the other terminal equipment 1b is a sink.

Character data entered by operating the keys 8 of the source terminal equipment 1a is converted into character codes by the character code generator 9. The character codes are sent through the control unit 17 to the MODEM 16, where the character codes are modulated. The modulated character codes are sent through the telephone line 7 to the MODEM 18, where the modulated character codes are demodulated. The demodulated character codes are sent through the control unit 19 to the memory 6, which stores the demodulated character codes. When a picture data of the original document A needs to be transmitted in succession to the character data, a command is given by means of the keys 8 to have the facsimile equipment 3 start reading the original document A. Picture signals given by the read unit 11 are converted into picture codes by the picture code generator 12, and then processed and transmitted through the control unit 17, the MODEM 16, the telephone line 7, the MODEM 18 and the control unit 19 and, finally, stored in the memory 6. The character codes and the picture codes are transmitted alternately and continuously. The control units 17 and 19 insert code identification signals between the successive character code and the picture code. The code identification signal given by the control unit 19 includes line density and MH of the picture data or the identification information of the modulating system such as the run length.

A reception start command is given by operating the keys 8 of the sink terminal equipment 1b to accept information from the host computer 4. According to the command given by the sink terminal equipment 1b or a command given by the source terminal equipment 1a, the codes stored in the memory 6 and directed to the sink terminal equipment 1b are selected as desired and transmitted sequentially through the control unit 19, the MODEM 18, the telephone line 7 and the MODEM 16 to the control unit 17. The control unit 17 identifies the character codes and the picture codes on the basis of the identification signals. The character codes and the picture codes are decoded alternately by the character signal generator 14 and the picture signal generator 13 respectively.

Thus, the communication system recognizes and discriminates between the character codes and picture codes. The character signals and the picture signals thus obtained are printed on the recording sheet B by the recording unit 15.

That is, the character data and the picture data entered separately by means of the keyboard 2 and the facsimile equipment 3 respectively are transmitted after being arranged sequentially by the control unit 17 and stored in the memory 6. In receiving the character data and the picture data stored in the memory 6, the same are read and decoded separately by the signal generators 13 and 14 of the facsimile equipment 3 and printed on the recording sheet B by the recording unit 15 of the same facsimile equipment 3. Accordingly, both the characters and the pictures are recorded integrally on the recording sheet B, which is convenient particularly for receiving a letter including illustrations or for attaching the handwritten signature to a printed letter printed by operating the keys 8. The picture data is transmitted in the form of picture codes as in the ordinary facsimile communication, whereas the character data is not transmitted in codes like the picture codes. The character data is transmitted in character codes each corresponding to a single character, therefore, it is possible to access the host computer 4 by entering commands by means of the keys 8 for interactive operation of the host computer 4, and thereby only the desired data can be selectively obtained. In storing picture codes in the memory 6, it is preferable to store the picture codes after converting the picture codes into codes of the same system as the character code by means of the control unit 19, which necessitates an operation such as differentiating the particular bits of both the codes to discriminate the converted picture codes from the character codes.

Figure 2:
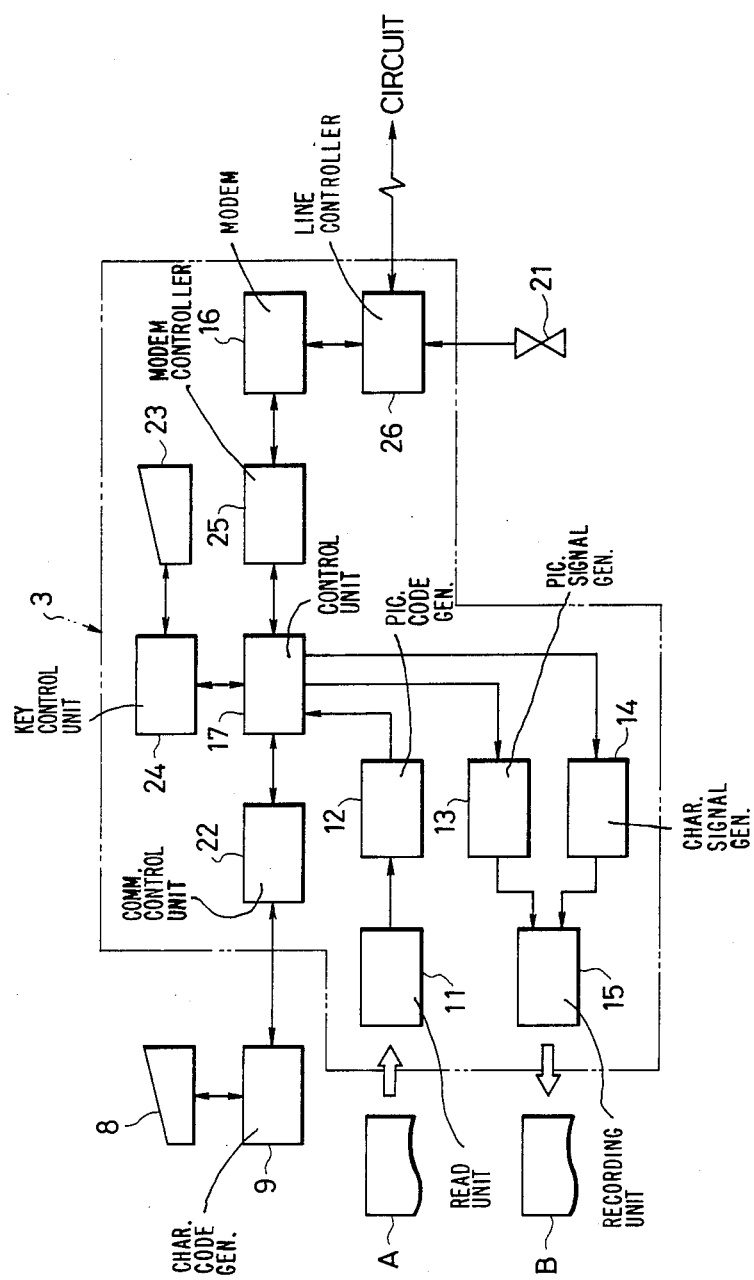
FIGS. 2 and 3 are block diagrams showing the respective constitutions of the facsimile equipment and the facsimile interface respectively.
Figure 3:
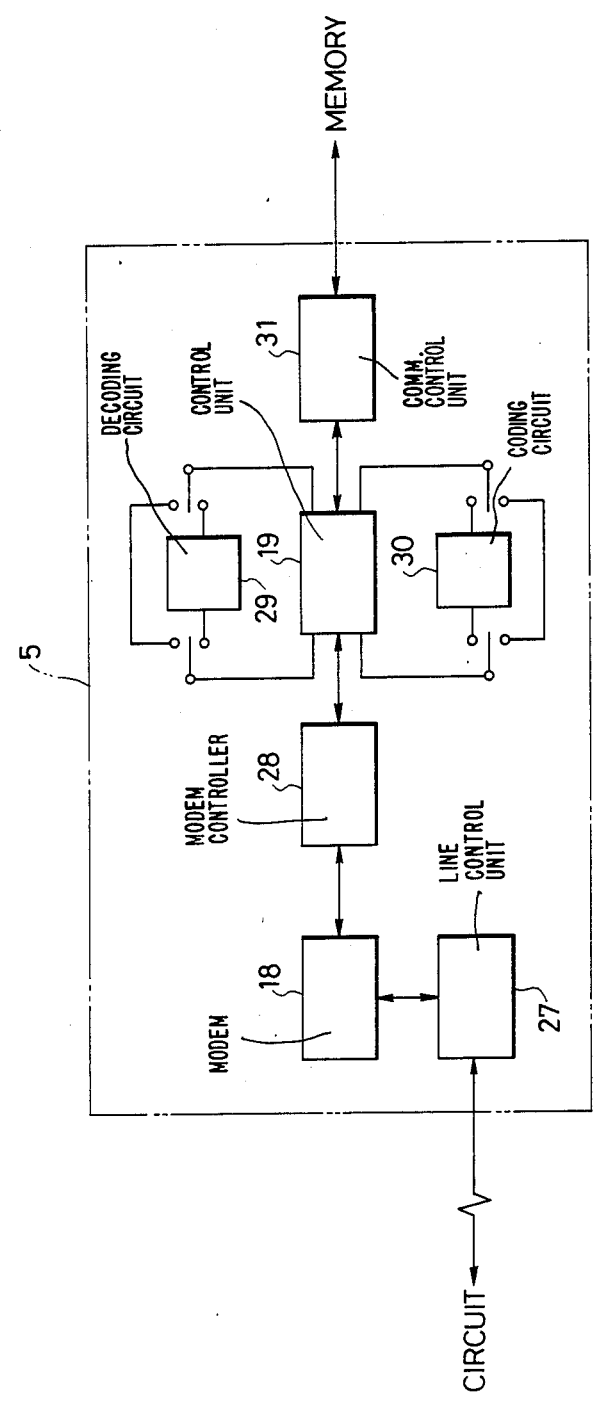
Figure 4:
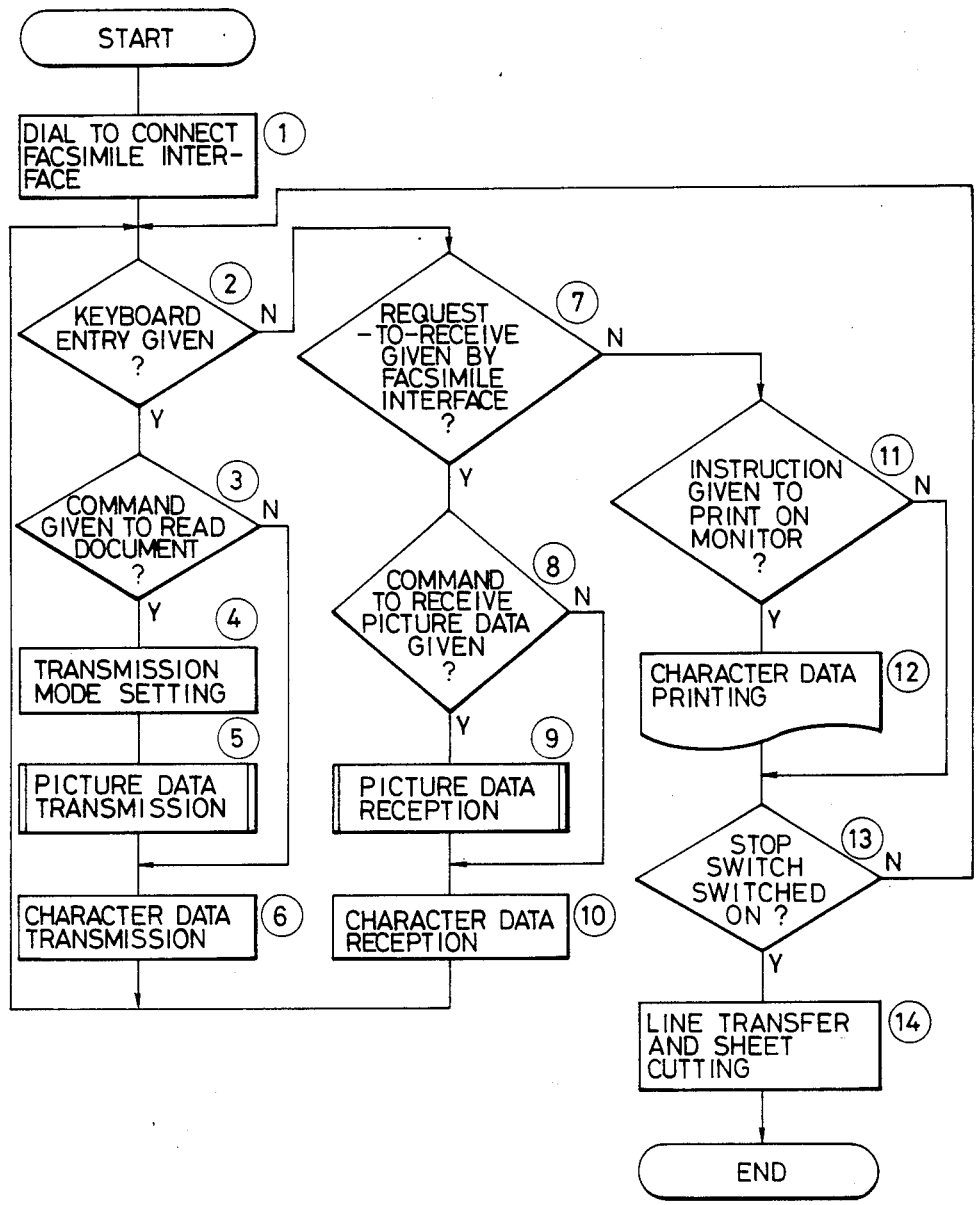
FIGS. 4 and 5 are flowcharts explaining the actions of the facsimile equipment and the facsimile interface of FIGS. 2 and 3.
Figure 5:
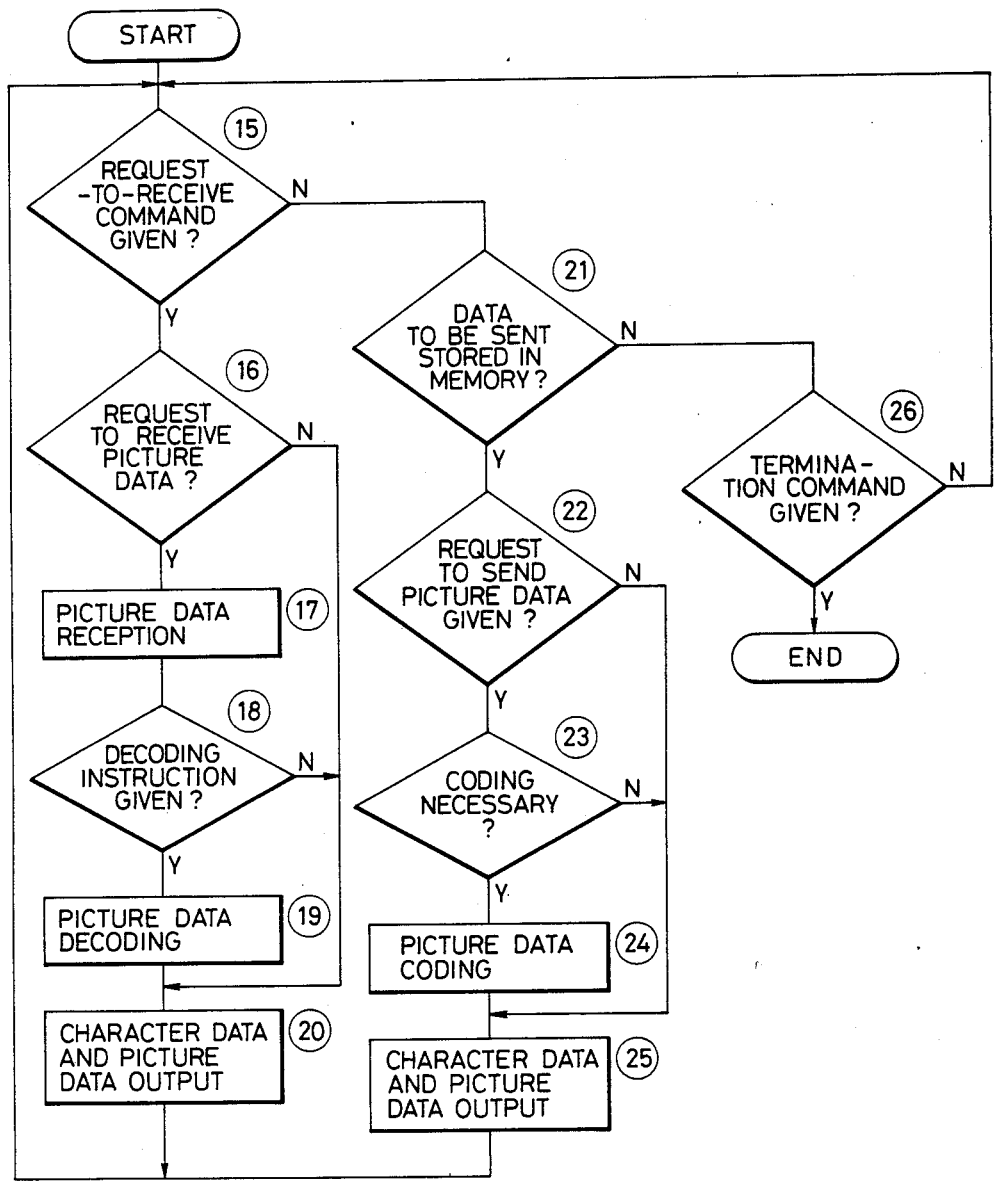

FIGS. 2 and 3 are block diagrams showing the details of the facsimile equipment 3 and the facsimile interface 5 respectively. In FIGS. 1 to 3, like reference characters designate like units throughout. FIGS. 4 and 5 are flow-charts for facilitating the explanation of the functions of the facsimile equipment 3 and the facsimile interface 5 respectively.

First the telephone 21 is dialed to connect the terminal equipment 1 to the facsimile interface 5 (Step ①) keyboard 2 is operated to issue a command to transmit data to the host computer 4 (Step ②). The control unit 17 decides whether the command is given for character data transmission or picture data transmission (Step ③). If picture data transmission, the control unit 17 sets the transmission mode (Step ④), then transmits the picture data of the original document A (Step ⑤) after performing preparation such as handshaking, then adds additional data such as the date and the sender (Step ⑥) after performing the postprocedure, and then advances to the next step. When the command is decided to be a character data transmission command at Step ③, the character data entered by means of the keyboard 2 is transmitted at Step ⑥. When no data transmission command is given by means of the keyboard 2 at Step ②, decision is made if request-to-receive is given by the facsimile interface 5 (Step ⑦). If a picture receive command is given (Step ⑧), the picture data is received (Step ⑨). If a character receive command is given, the character data is received (Step ⑩). In the case of the request-to-receive, only the character data may be printed (Step ⑫) with a printer connected optionally to the keyboard 2 by instructing monitor printing (Step ⑪). The entire procedure is completed by switching on a stop switch (Step (⑬)) to perform line transfer and sheet cutting (Step ⑭). In FIG. 2, indicated at 22 is a communication control unit for interconnecting the keyboard 2 and the facsimile equipment 3, at 23 are keys for setting the mode, at 24 is a control unit for controlling the keys 23, at 25 is a control unit for controlling the MODEM 16 and at 26 is a line control unit. A display unit such as a CRT may be incorporated into the keyboard 2 in order to display the contents of communication.

The facsimile interface 5 monitors if a receive command is given by the terminal equipment 1 (Step ⑮).

If a request to receive a picture is given (Step ⑯), the facsimile interface 5 receives the picture data and sends the same to the memory 6 (Steps ⑰) through ⑳). When the picture data is given in the form of the MH code, the picture data is sent out in the form of the MH code or, sometimes the picture data is sent out after being decoded (Steps ⑱ and ⑲) into run length codes. If a request to receive the character data is given, the above-mentioned steps are skipped and the character data is sent out (Step ⑳) as it is. When no command to receive is given by the terminal equipment, the data stored in the memory 6 is retrieved (Step ㉑) and if any data to be transmitted to the terminal equipment is found and the terminal equipments requests to send the data (Step ㉒), the same data is sent out to the line (Steps ㉓, ㉔ and ㉕). When the picture data stored in the memory 6 is in the form of run length codes and the picture data needs to be converted into MH codes, the picture data is coded into the MH codes at Steps ㉓ and ㉔ the picture data is sent out in the form of the MH codes. When no data meeting the request is found in the memory 6, the communication is terminated upon the issuance of a termination command. In FIG. 3, indicated at 27 is a line control unit, at 28 is a control unit for controlling the MODEM 18, at 29 and 30 are circuits for decoding and coding at Steps ⑩ and ㉔ at 31 is a communication control unit for controlling the memory 6 and the peripheral equipments of the same.

According to the present invention, first handwritten sentences and the like can be sent to remote terminal equipments at a desired time and also a plurality of those data can be transmitted in a batch. Second, in the intercommunication between the terminal equipments and the host computer, since the character data entered by means of the keyboard is sent and received in the form of character codes, the host computer is directly accessible by the terminal equipments. Third, both the character data and the picture data entered separately by means of a keyboard and a facsimile equipment respectively are converted into black-and-white patterns by the facsimile equipment and printed out on a recording sheet, therefore, the character data and the picture data are recorded integrally and alternately on the recording sheet, which provides practically very convenient means of communication.

What is claimed is:

1. A facsimile/character communication system incorporating a plurality of terminal equipments, each of which includes a keyboard capable of character data input operation and a facsimile equipment capable of generating and receiving picture data and which operates in accordance with commands given thereto through the keyboard, and a host computer connected through telephone lines to the terminal equipments and having a memory; said computer accepting and integrally storing the character data entered through the keyboards and the picture data given by the facsimile equipments in its memory and transmitting such data to the terminal equipments, wherein each of the terminal equipments include:

means for transmitting to or receiving character data from another terminal through steps for converting the character data into character codes;

means for transmitting to or receiving picture data from another terminal through steps for converting the picture data into picture codes;

means for recognizing and discriminating between the converted picture codes and the converted character codes contained within a single data transmission; and means for recording received character data and picture data integrally on a recording sheet.

2. A facsimile/character communication system as claimed in claim 1, wherein said means for transmitting or receiving character data includes operation keys, a character code generator, a character signal generator, and a modulator and demodulator.

3. A facsimile/character communication system as claimed in claim 1, wherein said means for transmitting or receiving picture data includes a read unit, a picture code generator, a picture signal generator, and a modulator and demodulator.

4. A facsimile/character communication system as claimed in claim 1, wherein said means for transmitting or receiving character data includes a character signal generator and said means for transmitting or receiving picture data includes a picture code generator and wherein said means for discriminating the character and picture codes includes a control unit which operates the picture signal generator or the character signal generator, selectively.

* * * * *